United States Patent [19]
Umebayashi

[11] 4,455,454
[45] Jun. 19, 1984

[54] TELEPHONE TRANSMISSION SYSTEM ON A ROAD-VEHICLE

[75] Inventor: Kazuyuki Umebayashi, Tokyo, Japan

[73] Assignee: Aisin Seiki Kabushiki Kaisha, Kariya, Japan

[21] Appl. No.: 440,660

[22] Filed: Nov. 10, 1982

[30] Foreign Application Priority Data

Nov. 25, 1981 [JP] Japan ............... 56-188723

[51] Int. Cl.³ .......................... H04M 1/23
[52] U.S. Cl. .................... 179/2 E; 381/86; 455/88; 455/89
[58] Field of Search .......... 307/10 R; 179/2 E, 2 EA, 179/2 EB, 146 R; 381/86; 200/DIG. 39; 455/89, 90

[56] References Cited

U.S. PATENT DOCUMENTS 4,157,854 6/1979 Beauch ........................ 339/3

FOREIGN PATENT DOCUMENTS 0047498 3/1981 European Pat. Off. .
54-1972 1/1979 Japan .

Primary Examiner—Harold I. Pitts
Assistant Examiner—James L. Dwyer
Attorney, Agent, or Firm—Sughrue, Mion, Zinn, Macpeak, and Seas

[57] ABSTRACT

Branch telephone connection control signal communication between a dialling control board mounted on a steering wheel but held in a stationary state irrespective of a rotation of the steering wheel and an electric controller disposed at a position remote from a steering mechanism, the electric controller is connected to a mobile telephony device on a road-vehicle. The dialling control board is supported by a steering drive shaft through a toothed wheel mechanism, so that it remains stationary regardless of a rotation of the shaft. The control board and the electric controller are electrically coupled to each other through a combination of slip rings and brushes. The dialling control board and the electric controller each include an FSK modulation circuit, an FSK demodulation circuit and a microprocessor for controlling transmission or reception of the electric signals. Key inputs on the dialling control board are encoded by the dialling control board and then transmitted to the electrical controller. The electric controller decodes the received code and then renders operation instructions to the mobile telephony device. A microphone for driver's speaking is equipped on a front panel and connected to the mobile telephony device. In another embodiment, the microphone is equipped on the dialling control board and connected to the mobile telephony device through an electric-magnetic coupling of a pair of electric coils.

16 Claims, 19 Drawing Figures

TELEPHONE TRANSMISSION SYSTEM ON A ROAD-VEHICLE

BACKGROUND OF THE INVENTION

The invention relates to mobile communication, and more particularly, to telephone transmission between a branch telephone device equipped on a steering wheel and a mobile telephony station on a load-vehicle.

Among the parts on a vehicle, a steering wheel is located nearest to a driver and within easy access of the driver's hands. Therefore, in order to improve the operability of a branch telephone for a driver it is preferable that a control board having key switches including dialling key switches and a hook switch is mounted at the center of the steering wheel.

However, a steering mechanism for transmitting a rotation of the steering wheel to a steering shaft, has a complex structure, so it is difficult to make the wiring of signal cables for connecting the control board mounted at the center of the steering wheel (referred to as a dialling control board hereinafter) to an electric controller (mobile telephony station) fixed on the vehicle. According to a prior art system, the dialling control board is fixed on the steering wheel (refer to Japanese Patent Publication No. 1972/1979). This makes relatively annoying the operation of the dialling key switches on the dialling control board, because the dialling control board turns with the rotation of the steering wheel. According to another prior art system, the dialling control board is fixed on an inner panel at the front of a driver seat. In this case, dialling operation is relatively troublesome since the dialling key switches are remote from the steering wheel. Therefore, it is preferable to equip the dialling control board on the steering wheel in a floating and hence stationary state with respect to the steering wheel. Additionally, it is preferable to arrange a microphone for transmitting a driver's voice near the lips of the driver to decrease intermixture of noise and echo in the load-vehicle.

SUMMARY OF THE INVENTION

A first object of the invention is to make easy the dialling operation of the driver, a second object of the invention is to equip the dialling control board on the steering wheel in a floating and hence stationary state with respect to the steering wheel and to transmit dialling signals generated at the dialling control board to the mobile telephony station fixed on the load-vehicle, and a third object of the invention is to reduce electric power and signal lines between the dialling control board and the mobile telephony station on the load-vehicle.

According to the invention, dialling signals are transmitted between the dialling control board on the steering wheel and the fixed electric controller through a combination of slip rings and brushes or a pair of electric coils, and power is fed from the fixed electric controller to the control board also through a combination of slip rings and brushes or a pair of electric coils. For the purpose of preventing noises from mixing with the electric signal and facilitating a removal of noises from the electric signal, the dialling control board and the load-vehicle electric controller include modulation and demodulation circuits and a transmitting/receiving control device, respectively. A mobile telephony device and a branch connection device are connected to the fixed electric controller. Dialling data which are received by the fixed electric controller are in turn applied to the mobile telephony device.

In a preferred embodiment of the invention, the control board on the steering wheel is connected to a power line of a battery fixed on the vehicle through a combination of slip rings and brushes. The control board includes therein the modulation and demodulation circuits and the transmitting/receiving control device as well as dialling key switches for providing dialling instructions to the mobile telephony equipments, thereby to send a dialling code in accordance with the key switch operation to the power line through a carrier wave. The load-vehicle fixed electric controller includes the modulation and demodulation circuits and the transmitting/receiving control device, thereby to reproduce the original code from the carrier appearing on the power line. As required, the control board may include therein a display means such as lamps, light emitting diodes, a character display or a two-dimensional graphic display and/or an informing means such as a speaker and/or a microphone. The fixed electric controller sends a control signal to the power line through a carrier wave, while the control board reproduces the control signal from the carrier appearing on the power line. Source voltage is applied to the control board through the slip rings and brushes. The carrier wave modulated with the electric signals is transmitted from the control board to the fixed electric controller or vice versa.

In another preferred embodiment of the invention, the control board on the steering wheel is connected to the power line of the battery through the slip rings and brushes. The electric signals are superimposed on the carrier wave and then sent from the control board to the fixed electric controller or vice versa through a pair of electric coils opposite to each other.

Other objects and features of the invention will become apparent upon reading the description of the following embodiments with reference to the drawings.

DESCRIPTION OF EMBODIMENTS

Figure 1A:
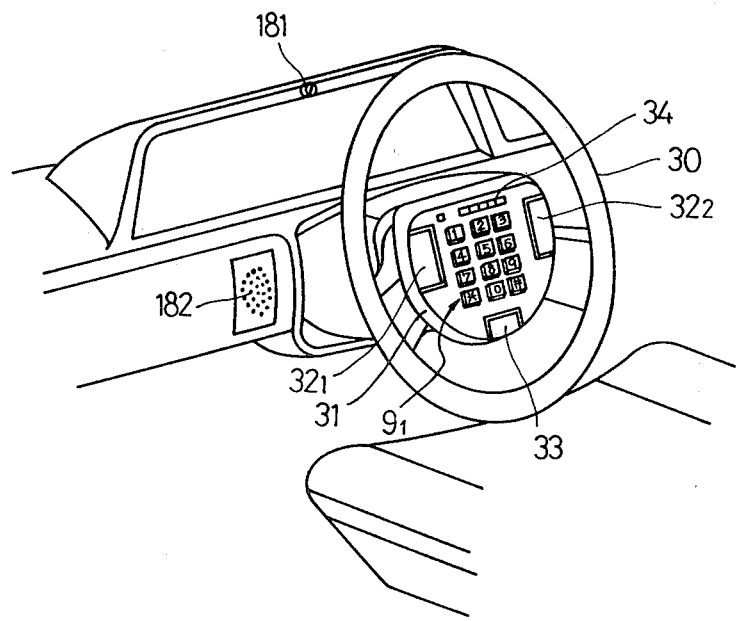
FIG. 1a is a perspective view of a dialling control board 31 mounted on a steering wheel 30 in a floating state with respect to the same.
Figure 1B:
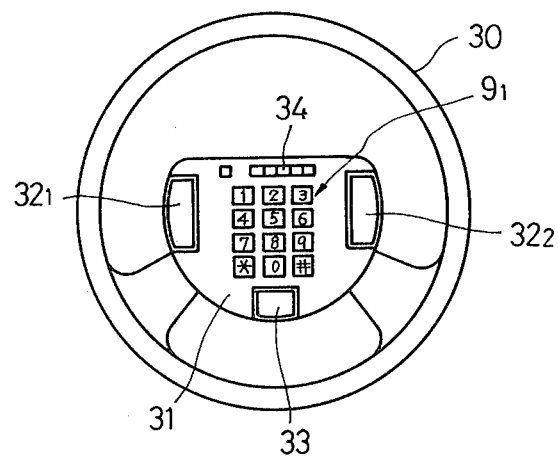
FIG. 1b is a front view of the dialling control board 31 mounted on the steering wheel 30 in a floating state with respect to the same.

FIGS. 1a and 1b show a steering wheel 30 of a vehicle and its surroundings in accordance with an embodiment of the invention. Referring to FIGS. 1a and 1b, a dialling control panel 31 for a branch telephone device is attached to the center of a steering wheel 30. There are equipped dialling key switches 91, hook key switch 33, 5 figures 7 segments character display 34 and horn switches 32₁, 32₂ on the dialling control board 31. A microphone 181 for transmitting driver's speaking is equipped on a front panel, and a speaker 182 is equipped on a front panel.

Figure 1C:
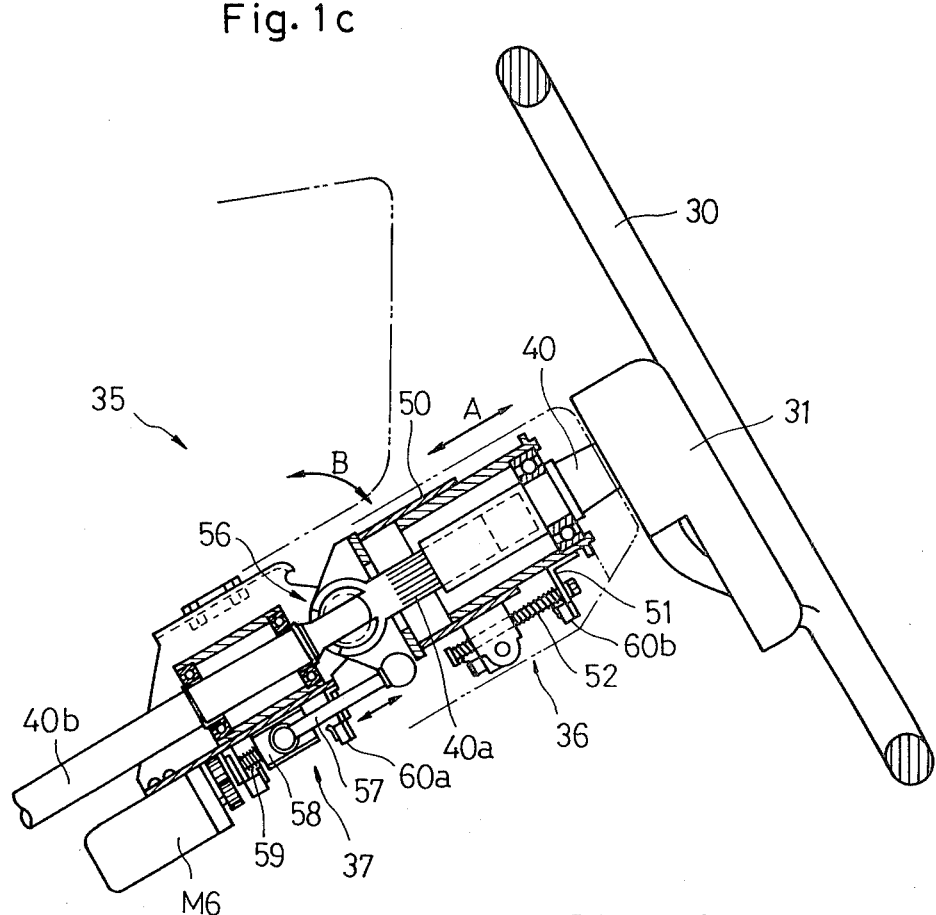
FIG. 1c is an enlarged longitudinal sectional view of a steering shaft telescoping mechanism 36 adapted to support the steering wheel 30.

FIG. 1c is a side view of a control section 35 of a steering mechanism. The control section 35 is roughly divided into the steering wheel 30, control panel 31, steering shaft telescoping mechanism 36 and a tilting mechanism 37.

A shaft 40b is rotatable at a fixed position and the shaft 40a is coupled to the shaft 40b through a universal joint 56 so as to be adjustable in its inclination (or tilt angle) in the direction indicated by an arrow B. The reference numeral 57 denotes an arm having one end which is connected to the fixed part of the telescoping mechanism 36 at a position spaced downwardly from the universal joint 56 serving as a fulcrum for the tilting motion and the other end which is connected to a nut 58 on the driving side. The nut 58 is in mesh with the threaded bolt 59 which is driven for rotation by a motor M6. Therefore, a rotation of the motor M6 allows the threaded bolt 59 to turn but causes the nut 58 not to turn, so that the nut 58 is moved in the axial direction (i.e. the direction indicated by the arrow A) and then the arm 57 is driven to turn the movable parts in the tilting mechanism about the universal joint 56. The reference numerals 60a, 60b in FIG. 2a denote limit switches used for detecting upper limit positions of the movable parts in the tilting mechanism and the telescoping mechanism, respectively.

Figure 1D:
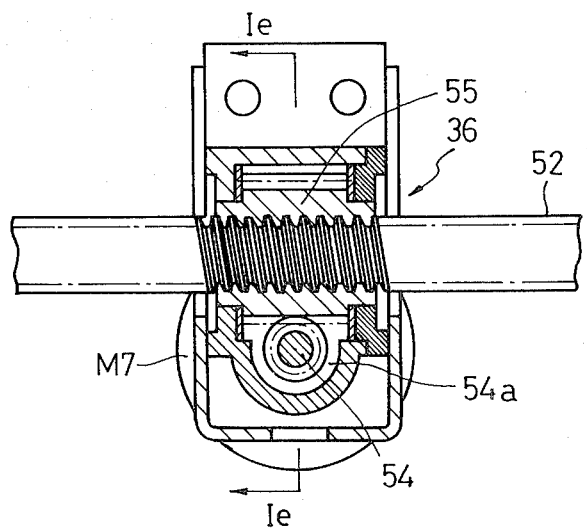
FIG. 1d is an enlarged longitudinal sectional view of a part of the steering shaft telescoping mechanism 36 shown in FIG. 1c.
Figure 1E:
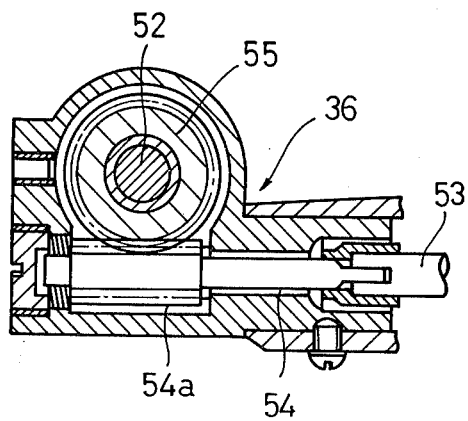
FIG. 1e is a sectional view taken along the line Ie—Ie in FIG. 1d.

FIG. 1d is an enlarged sectional view of a driving section of the steering shaft telescoping mechanism 36, and FIG. 1e is a sectional view taken along the line Ie—Ie in FIG. 1d. The steering shaft telescoping mechanism 36 functions to move the steering wheel 30 forward or backward relative to the driver and is driven by a motor M7 in this embodiment. The main shaft 40 is fitted to a shaft 40a slidably not in the rotational direction but in the axial direction indicated by an arrow A. A guide member 50 on the fixed side mounts thereon the driving section including the motor M7, which drives a threaded bolt 52 fixedly attached to a bracket 51 on the movable side. A shaft 43 of the motor M7 is coupled to a worm shaft 54, while a worm gear 54a formed on the worm shaft 54 is meshed with the threaded outer peripheral surface of a nut 55. The nut 55 is engaged with the threaded bolt 52 and rotatable at a fixed position, so that upon the rotation of the motor M7 the worm gear 54a is turned and this causes the nut 55 to rotate and then the threaded bolt 52 to move forward (or backward) in the axial direction indicated by the arrow A. Consequently, the movable parts including the steering wheel 30 are moved forward or backward in the axial direction of the main shaft 40, i.e. in the direction indicated by the arrow A, while being guided by the guide member 50. Upon this, the steering wheel 30 is elevated or lowered.

Figure 2A:
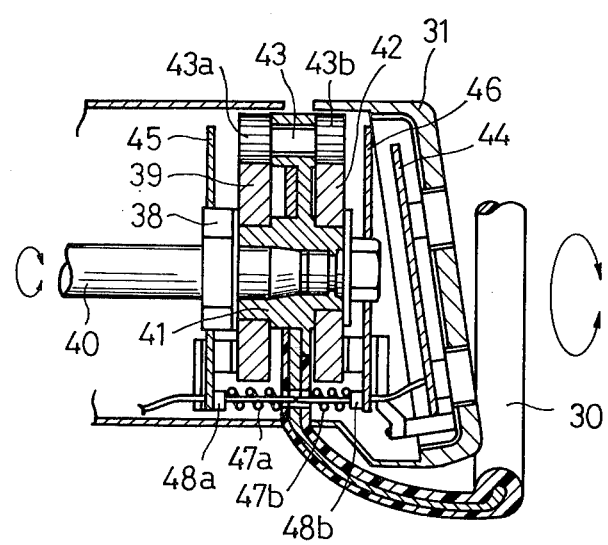
FIG. 2a is a longitudinal sectional view showing a combination of slip rings 45, 46 and brushes 48a, 48b in accordance with a first embodiment of the invention.

FIG. 2a is a sectional view showing a support structure for the steering wheel 30 and the control panel 31. A support 38 and a toothed wheel 39 are fixedly attached to a vehicle body, while a steering main shaft 40 is rotatably retained by the support 38. A support 41 is coupled to the steering wheel 30 and the steering main shaft 40 while rotatably supporting the toothed wheels 39, 42 and a connecting member 43. The connecting member 43 includes at both ends thereof toothed wheels 43a, 43b having the same number of teeth as the toothed wheels 39, 42 and in mesh therewith, respectively. The control panel 31 and a printed circuit board 44 including an attitude control circuit are fixedly mounted to the toothed wheel 42. Slip rings 45, 46 are fixedly mounted to the support 38 and the control panel 31, respectively, while brushes 48a and 48b are pressed against the slip rings 45 and 46 respectively by the action of compressed coil springs 47a and 47b, thereby to electrically conduct between the slip rings 45 and 46. Besides, the toothed wheels 39, 42 have the number of teeth equal to each other.

The above stated construction aims to prevent the control panel 31 from turning together with rotation of the steering wheel 30. In this embodiment, when the steering wheel 30 is rotated, the support 41 and the steering main shaft 40 are turned for the steering operation. On this occation, since the toothed wheels 43a, 43b have the same number of teeth as the toothed wheels 39, 42, respectively, an arc-shaped movement of the connecting member 43 due to the turning of the support 41 produces relative movements not only between the support 41 and the toothed gear 39 but also between the support 41 and the toothed gear 39. But the extents (or angles) of such relative movements are equal to each other. As a result, the toothed wheel 42 is not rotated with respect to the toothed wheel 39 and hence, the rotation of the steering wheel 30 will not cause the control panel 31 to be turned. The power is fed to the printed circuit board 44 through the slip rings 45, 46 and the brushes 48.

Figure 2B:
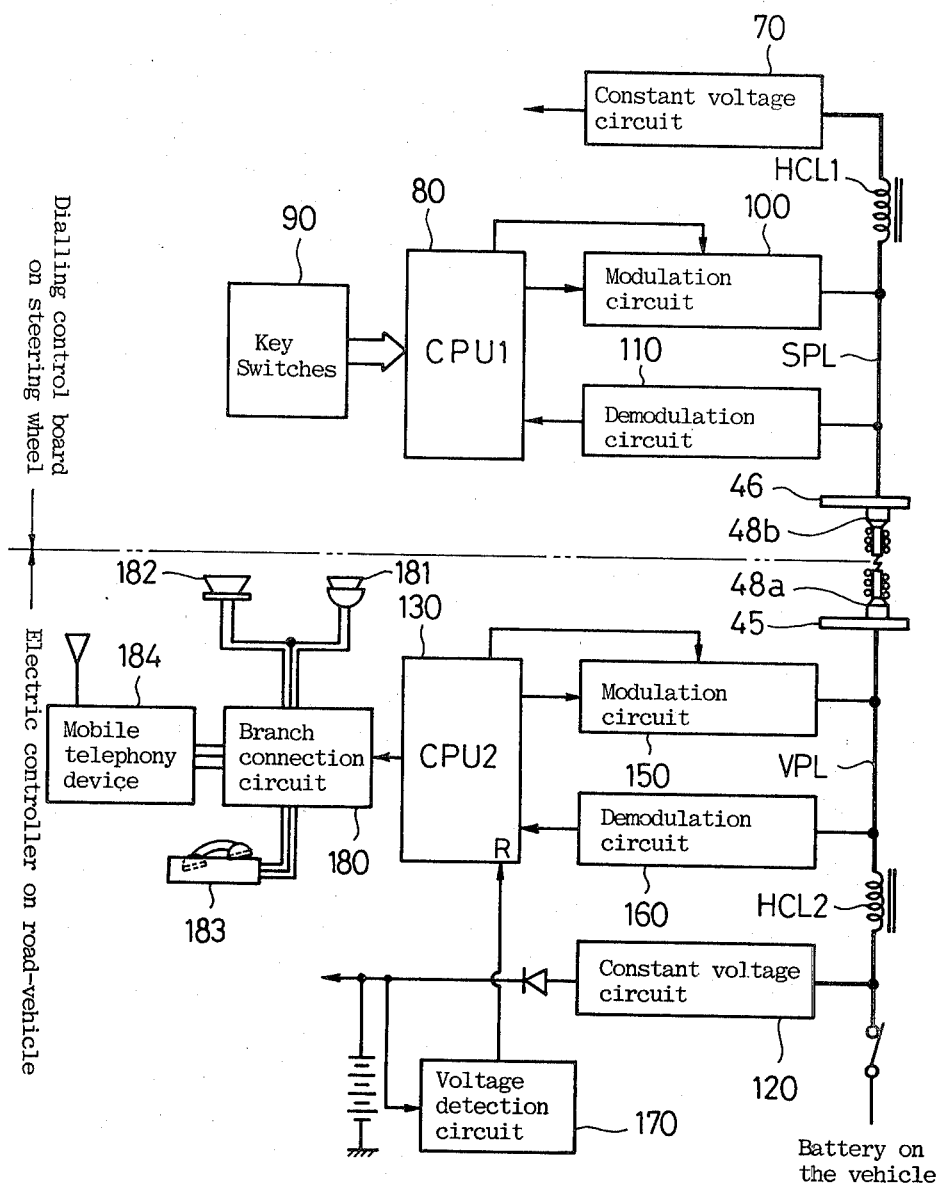
FIG. 2b is a block diagram showing a schematic constitution of the first embodiment.

Referring to FIG. 2b, the control board 31 includes therein a constant voltage power supply unit 70, a microcomputer unit 80 serving as a transmitting control device, key switches 90, an FSK (Frequency Shift Keying) modulation circuit 100, and FSK demodulation circuit 110 and a coil HCL1 for interrupting high frequency. A fixed electric controller locating on the side of a load-vehicle battery includes therein a constant voltage power supply unit 120, a microcomputer unit 130 serving as a receiving control device, an FSK modulation circuit 150, an FSK demodulation circuit 160 a coil HCL2 for interrupting high frequency, a voltage detection circuit 170, an additional battery 171, a branch connection circuit 180, the driver's microphone 181, the driver's speaker 182, another branch telephone 183 and a mobile telephony device 184. The key switches 90 including the dialling key switches 91 and the hook switch 33, the microcomputers 80 and 130, the microphone 181 and the speaker 182 are constructed as a branch telephone for the driver. The other branch telephone 183 is fixed at a place remote from the driver seat.

The constant voltage power supply unit 120 is directly connected to a power line of the load-vehicle battery, while the slip ring 45 fixed on the vehicle side is connected to the power line through the coil HCL2. An output terminal of the FSK modulation circuit 150 and an input terminal of the FSK demodulation circuit 160 are connected to the slip ring 45. The brush 48a is brought into contact with the slip ring 45 and the other brush 48b connected to the brush 48a is brought into a contact with the slip ring 46 fixed on the control board side. As described later, the slip rings 45, 46 are stationary, but the brushes 48a, 48b are turned upon a rotation of the steering wheel. To the slip ring 46 there are connected an output terminal of the FSK modulation circuit 100, an input terminal of the FSK demodulation circuit 110 and one end of the coil HCL 1. The other end of the coil HCL 1 is connected to the constant voltage power supply unit 70. The reference symbol SPL denotes a power line on the control board side, while VPL denotes a power line on the electric controller side. These power lines are connected to each other through the slip rings 45, 46 and the brushes 48a, 48b, and hence function as lines for transmitting or receiving an FSK modulation wave.

Figure 2C:
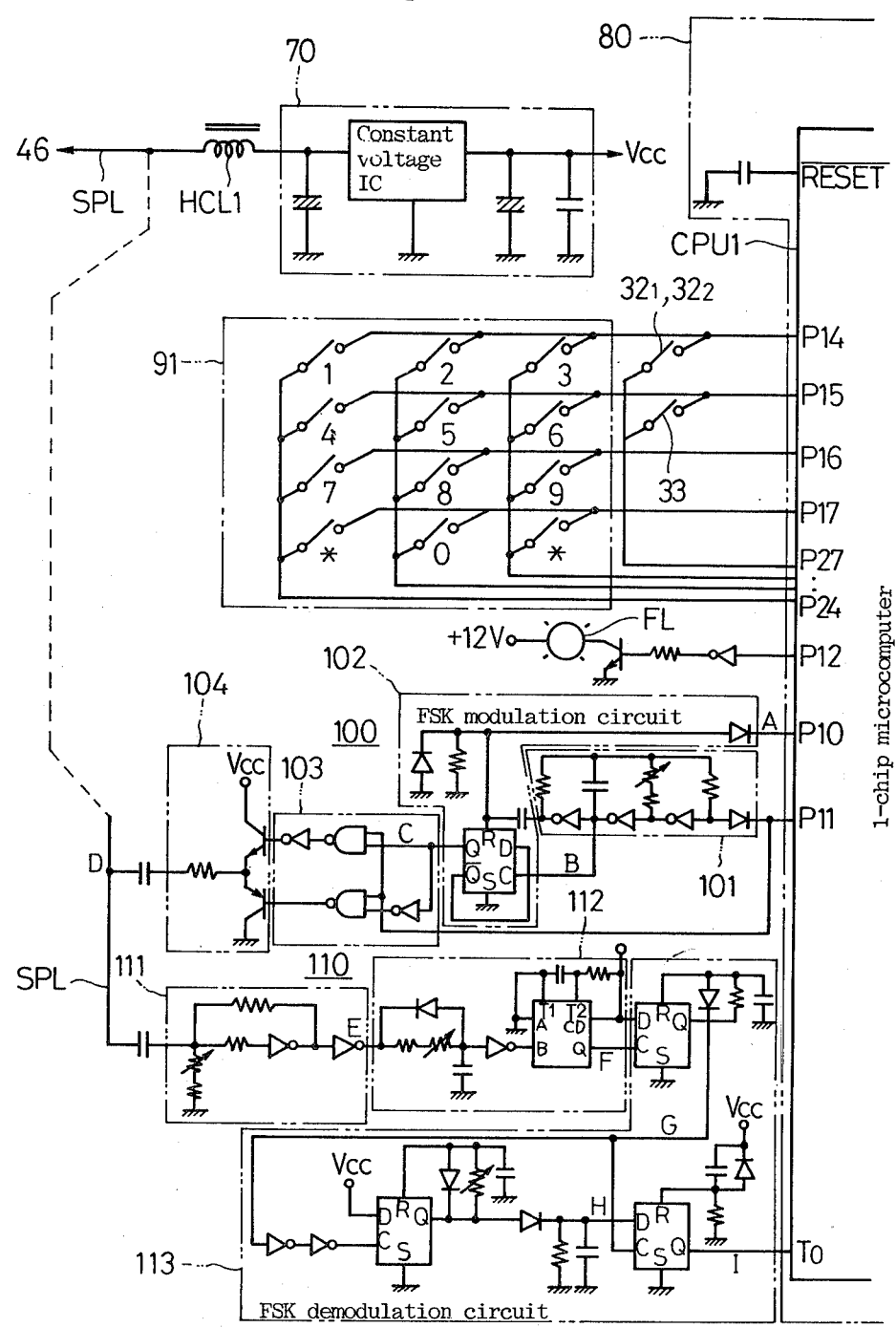
FIGS. 2c and 2d are block diagrams showing a constitution of an electric unit incorporated in the dialling control board 31 in accordance with the first embodiment, the entire electric unit being shown by joining the block diagrams shown in FIGS. 2c and 2d together.
Figure 2D:
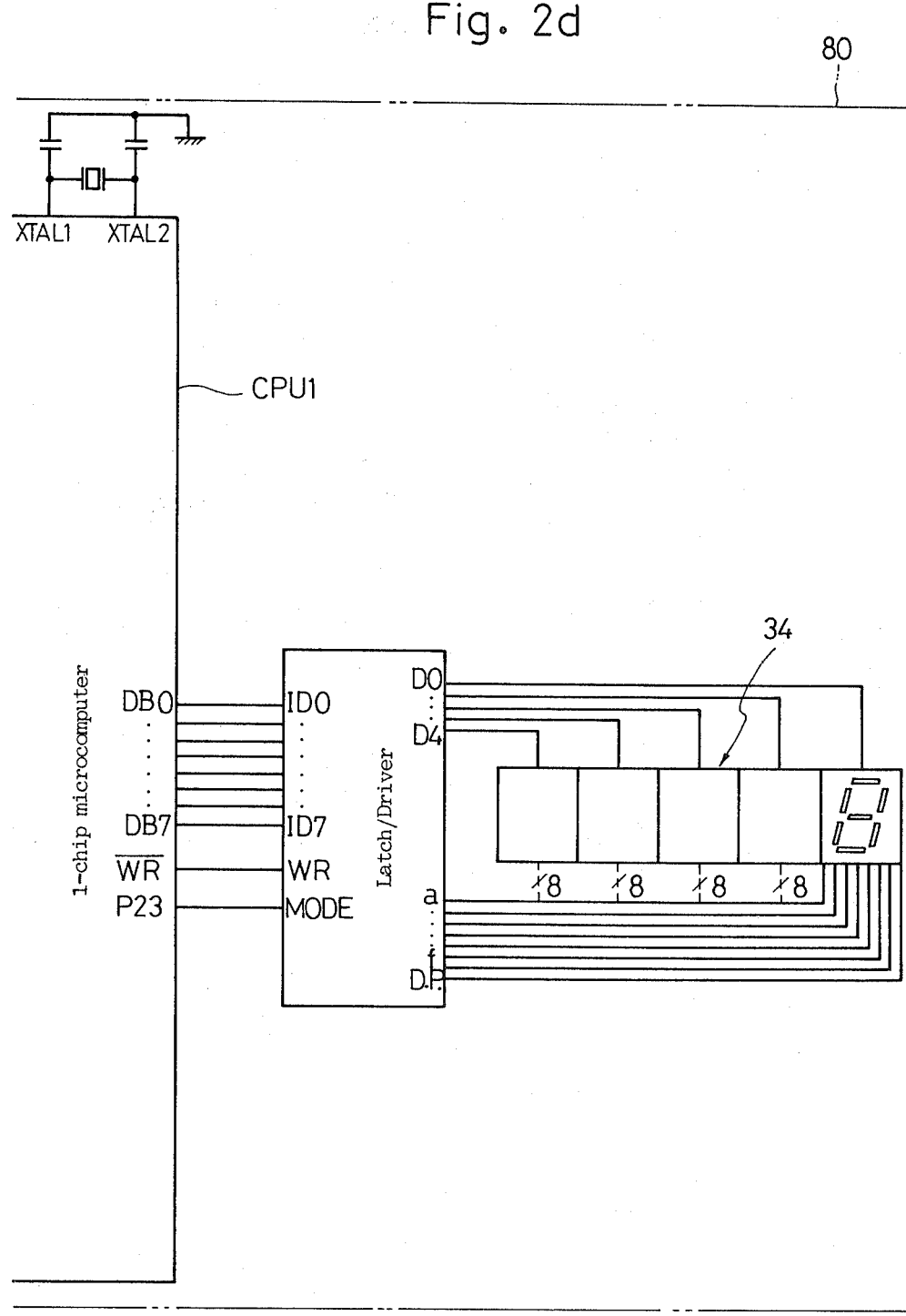

Referring to FIGS. 2c and 2d there is shown in detail an electric circuit unit of the control board 31, the key switches 90 shown in FIG. 2b comprise a key input section 91 (FIG. 2c) which includes a combination of momentary key switches closed only while the keys are being depressed. The FSK modulation circuit 100 comprises a pulse oscillator 101, an FSK modulator 102, an output cut-off gate 103 and a transmitting driver 104, whereas the FSK demodulation circuit 110 comprises an amplifying/waveform shaping circuit 111, a noise interrupting circuit 112 and an FSK demodulator 113. The microcomputer unit 80 comprises 1-chip microcomputer CPU1, an address latch ADL, a semiconductor read only memory ROM, input/output ports I/O, a reset switch and a clock pulse oscillator. The ROM stores therein key input reading program data and transmitting control program data, the latter data of which functions to form a transmitting code in accordance with a change of the key state and then transmit thus formed code. The display 34 is connected to a latch/driver which in turn connected to the microcomputer CPU1.

Figure 2E:
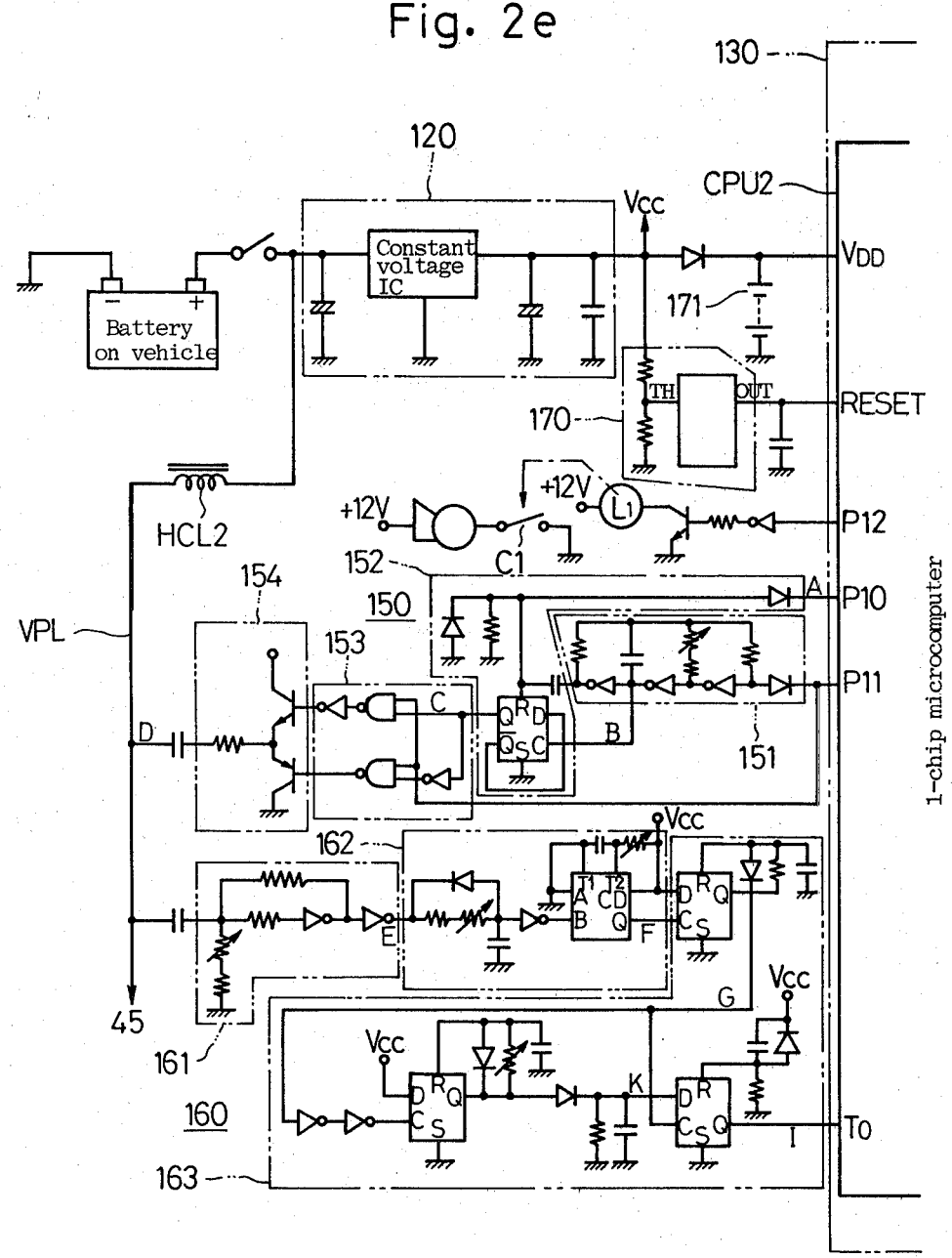
FIGS. 2e and 2f are block diagrams showing a constitution of a load-vehicle fixed electric controller in accordance with the first embodiment, the entire electric controller being appeared by joining the block diagram shown in FIGS. 2e and 2f together.
Figure 2F:
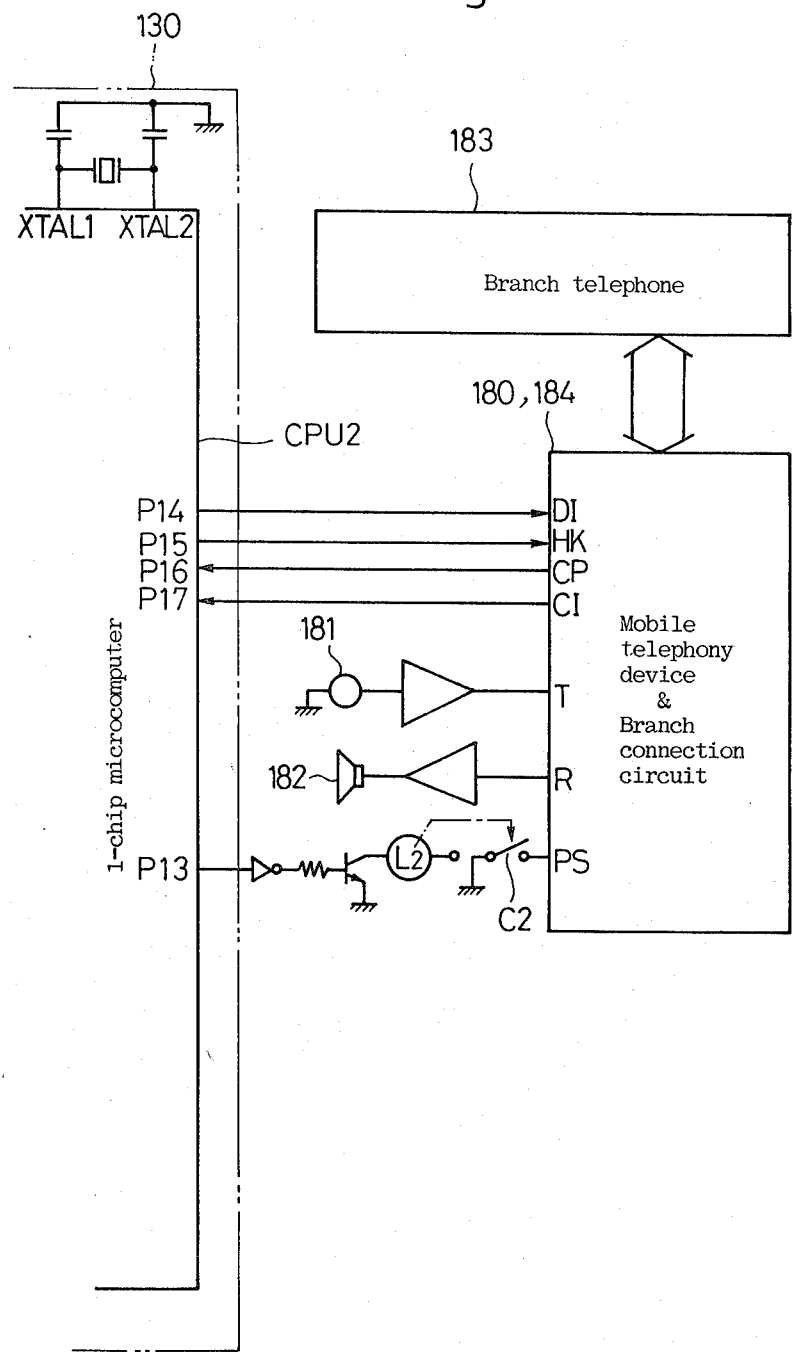

Referring to FIGS. 2e and 2f there is shown in detail the electric controller fixed on the vehicle at a position remote from the steering wheel 30, the fixed electric controller includes therein an FSK modulation circuit 150 (comprising a pulse oscillator 151, an FSK modulator 152, an output gate 153 and a transmitting-driver 154) and an FSK demodulation circuit (comprising an amplifying/waveform shaping circuit 161, a noise interrupting circuit 162 and an FSK demodulator 163), similarly to the control board 31. The mobile telephony device 184 and the branch connection circuit 180 are connected to input ports P14–P17 of the microcomputer CPU2. In the mobile telephony device and the branch connection circuit 184 and 180, reference symbol DI denotes a dialling code input terminal, HK a hook signal (ON-hook/OFF-hook) input terminal, CP a clock pulse output terminal of 1200 baud, CI an inhibition signal ("0": speech able, "1": speech disable) output terminal, T a branch telephone speech input terminal, R a branch telephone speech output terminal, and PS a power ON/OFF control signal input terminal. An input terminal of the voltage detecting circuit 170 is connected to an output terminal of the constant voltage circuit 120. An output terminal of the voltage detecting circuit 170 is connected to "RESET" input terminal of the microcomputer CPU2. On occasion of voltage drop of the constant voltage circuit 120, the voltage detecting circuit 170 apply "RESET" signal to the microcomputer CPU2. When a relay coil $L_1$ is energized to close a contactor C1, which in turn energize a horn on the load-vehicle. The microphone 181 and the speaker 182 are connected to input and output terminals T and R of the mobile telephony device 180, 184 through an amplifier respectively. Dialling signals and hook signal generated at the dialling control board 31 are transmitted to the mobile telephony device 180, 184 through the microcomputers CPU1, CPU2 and FSK modulation and demodulation circuits 100, 160. A read only memory ROM of the unit 130 stores therein control program data which is used to read the received code and then control the output ports P12, P16 and P17, as well as FSK transmitting/receiving control program data.

Figure 3A:
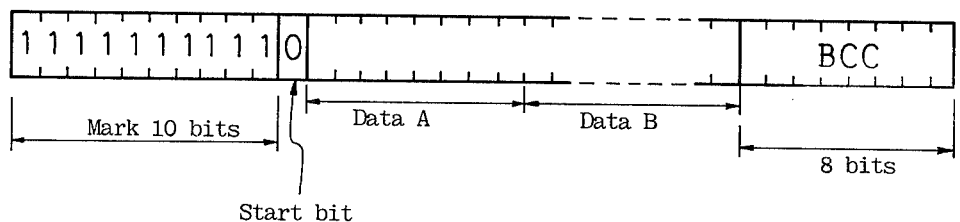
FIG. 3a is an explanatory view showing a bit arrangement of an electric signal sent from the control board 31 to the electric controller.
Figure 3B:
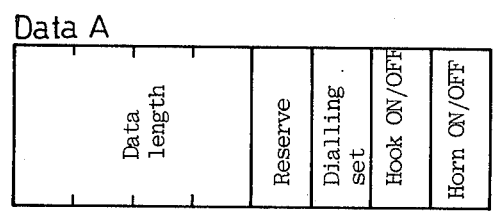
FIG. 3b is an explanatory view showing the content of data A in the electric signal.
Figure 3C:
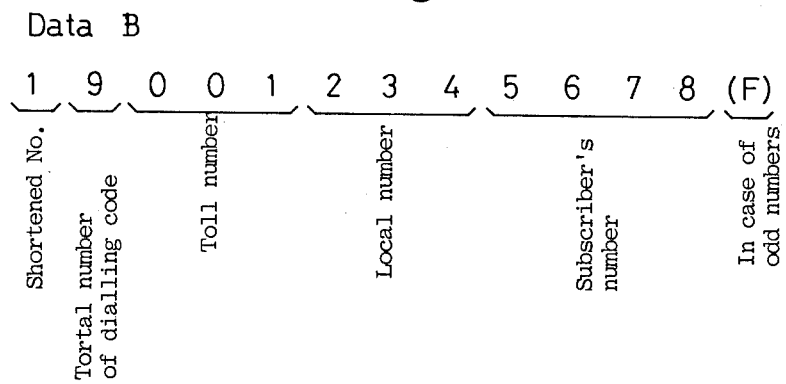
FIG. 3c is an explanatory view showing the content of data B in the electric signal.
Figure 3D:
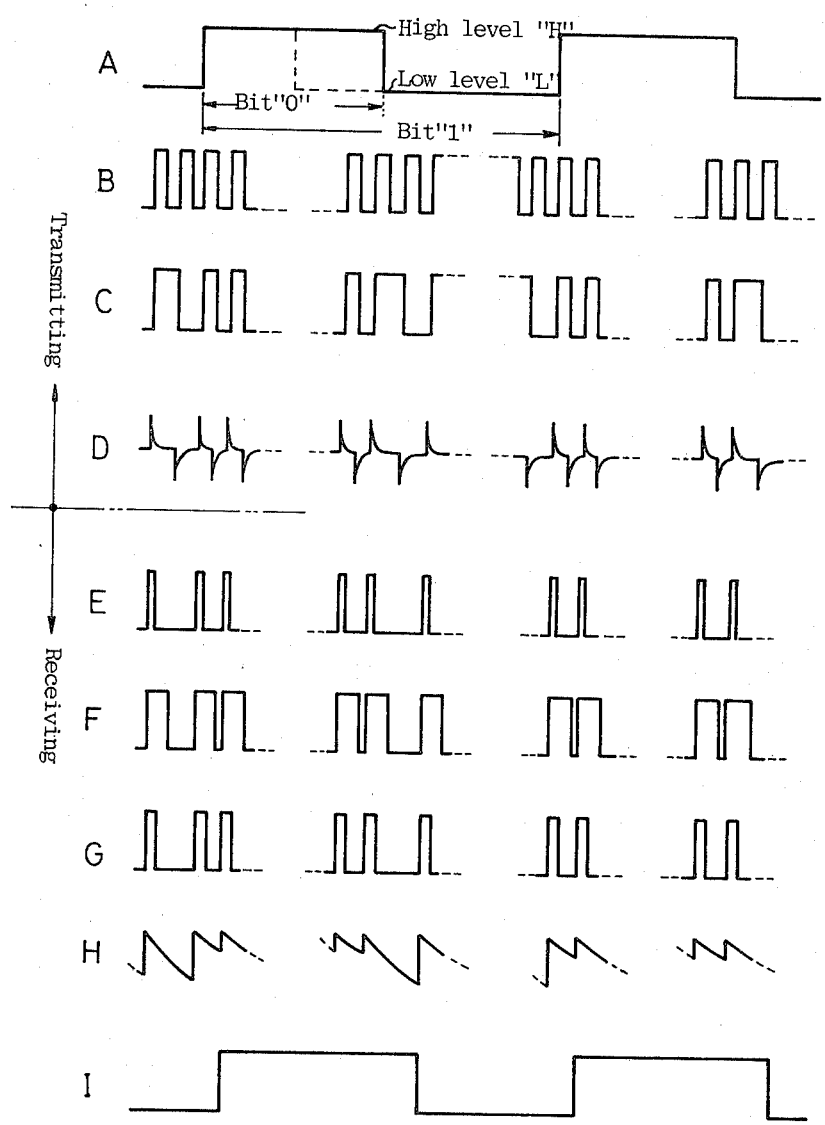
FIG. 3d is a time chart showing a transmitting signal from the dialling control board 31 and a receiving signal of the electric controller.

FIG. 3d illustrates input and output signals for the FSK modulation circuits 100, 150 and the FSK demodulation circuits 110, 160 shown in FIGS. 2c and 2e. The manner of operation of the FSK modulation circuit 100 (500 operates in the same manner) and the FSK demodulation circuit 110 (160 operates in the same manner) will be now described by referring to FIG. 3d. Firstly, when an output port P11 of 1-chip microcomputer CPU1 assumes a high level H, the pulse oscillator 101 is actuated to generate a train of constant frequency pulses B. In this state, a high level H at an output port P10 causes output C from the modulator 102 to become pulses in synchronism with the pulses B, whereas a low level L at the output port P10 causes the output C to become pulses with half frequency of the pulses B. Therefore, the output C gives the pulses B while P10 assumes an H level but gives the pulses with half frequency of the pulses B while P10 assumes a L level. Such output C is amplified by the driver 104 and then sent out to the power line SPL. A coupling capacitor is interposed between the transmitting driver 104 and the power line SPL, so that bi-polar pulses D appear on the SPL. When appearing on the power line SPL, those bi-polar pulses D are amplified by the amplifying/waveform shaping circuit 111 after passing through a coupling capacitor and shaped into positive pulse E, which in turn applied to the noise interrupting circuit 112 so as to have a predetermined pulse width. More specifically, the positive pulses E are increased in their widths of a high level H (as shown by F) and then integrated by the demodulation circuit 113 so as to be converted into an analog signal (denoted by H). This analog signal is further converted into a binary signal I assuming either a high level H or a low level L, which binary signal is applied to an input terminal To. The microcomputer CPU1 in the unit 80 causes the output port P10 to assume H in a time period of T and L in a subsequent time period of T and then allocates one combined cycle of 2T to 1 bit with the transmitting bit being of H, whereas the microcomputer CPU1 causes the output port P10 to assume H in a time period of ½ T and L in a subsequent time period of ½ T and then allocates one combined cycle of T to 1 bit with the transmitting bit being of L. In a receiving mode, the microcomputer CPU1 makes such a judgment that 1 bit of H has arrived if the input terminal To assumes H in a time period of T, or that 1 bit of L has arrived if the input terminal To assumes H in a time period of ½ T. The microcomputer CPU2 in the unit 130 also performs the processing or decoding of the transmitting/receiving signals in the same manner.

As illustrated in FIG. 3a, a frame of the transmitting signal has a time-serial arrangement which comprises a mark code 10 bits of H representing the head of the frame, 1 bit of L representing the beginning of data, 8 bits of data A, n bytes of data B and 8 bits of CRC check bits. As shown in FIG. 3b, the A group is allocated to data (key switch state informing bits) used for instructing the actuation of a horn and dialling of the driver branch telephone, whereas the B group is allocated to data (dialling No. informing bits) used for instructing dialling of telephone.

Figure 4A:
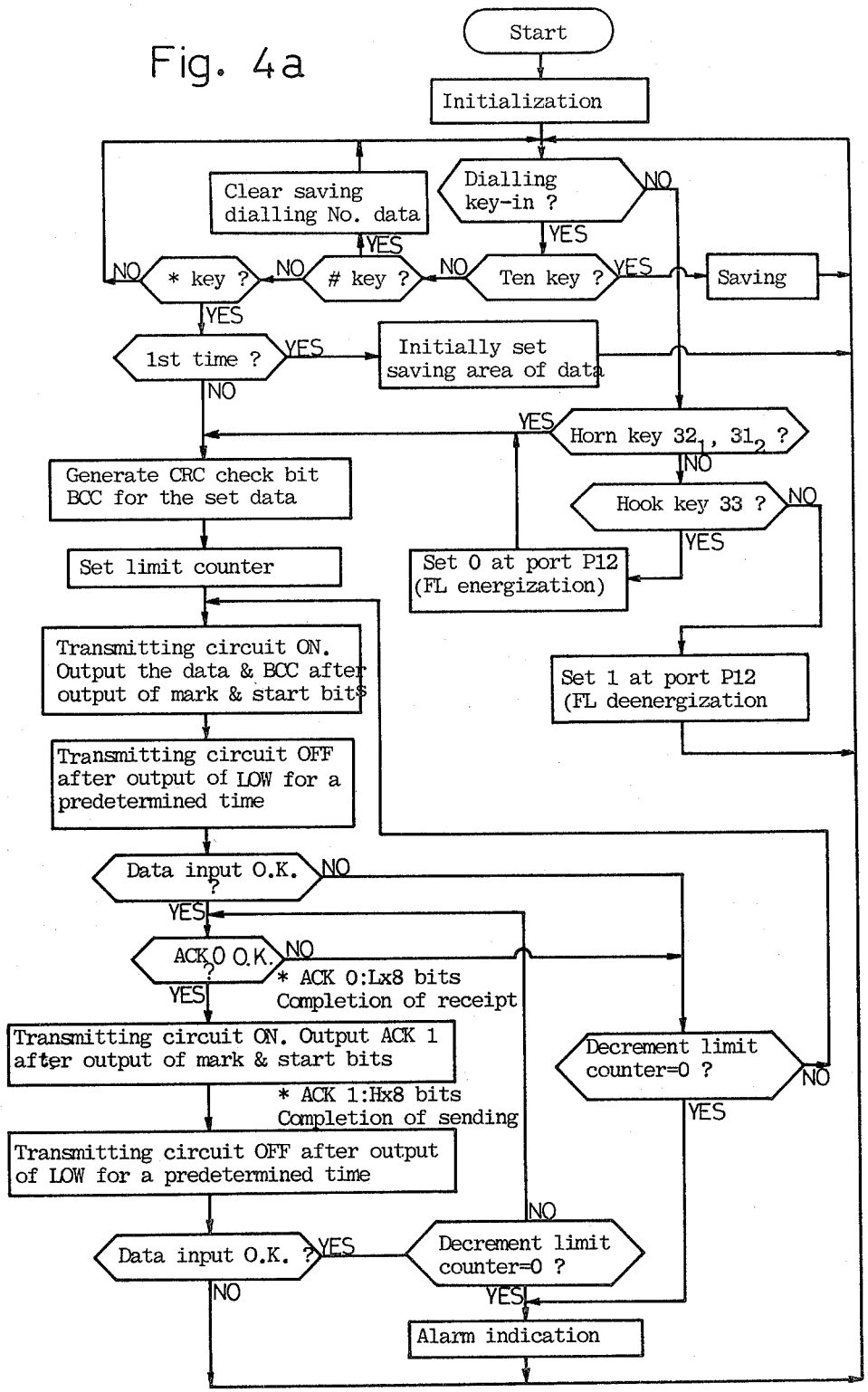
FIG. 4a is a flow chart showing the signal processing operation of a microcomputer CPU1 shown in FIGS. 2c and 2d.

FIG. 4a shows a flow chart for a transmitting/receiving control of the microcomputer unit 80 (FIG. 2c) incorporated in the control board 31. The transmitting/receiving control of the unit 80 will be now described with reference to FIG. 4a. When power is fed to the CPU1 in the unit 80, the CPU1 initializes an input reading register and input/output ports I/O and then monitors the input ports P14 to P17. Thereafter, reading the input ports P14 to P17, the CPU1 sequentially and repeatedly sets low output to each of the output ports P24 to P27. If there occurs closure of one of the dialling key switches 0 through 9, the CPU1 set a data indicating switch No. in a key-in memory and a display register. The display 34 shows a numeral character corresponding to the switch No. If there occurs closure of a key switch of * mark, the CPU1 refers a flag register and sets it "1" in case when the content of the flag register is "0" because this state means that the closure of the key switch of * mark is at the first time. Thereafter the CPU1 initializes memory address of the display register. In case when the content of the flag register is "1", the CPU1 clears the content of the flag register and converts key-in informations into the transmitting data (data A plus data B). If there occurs closure of horn key switch 32₁ or 32₂, the CPU1 arranges the transmitting data. Then the CPU1 form the CRC check bits BCC for the transmitting data. Thereafter, a predetermined value is set in a counter (program counter) for checking a transmitting/receiving error and H is set at the output port P10 to allow the output port P10 to issue pulses with a cycle of 2T (when bit=H) or T (when bit=L) at a rate of 1 cycle to 1 bit in accordance with the individual bits of the mark code, start bit, data and the BCC. In this way, the bipolar pulses D corresponding to the serial bit arrangement of the transmitting frame (FIG. 3a) reaches the FSK demodulation circuit 160 of the fixed electric controller through the power line SPL—slip ring 46—brush 48b, 48a—slip ring 45— power line VPL. The bipolar pulses D are then demodulated, so that pulses similar to those sent out from the output port P10 of the CPU1 incorporated in the control board 31 are applied to the input port To of the CPU2 in the fixed electric controller.

After sending out 1 frame (FIG. 3a), the CPU1 in the control board 31 causes a timer (program timer) to turn on and upon this, the output port P10 issues pulses with a cycle of ½ T representing L. When the preset time is over, the output ports P10, P11 assume L at the same time and then, after turning the timer on, it will wait that the input port To assumes H. If the input port To becomes H before the present in over, a time period of H is counted to decide whether the oncoming bit is of H or L and the data is stored in a receiving register while incrementing a bit number count register. Thereafter, this increment will be repeated in a similar manner every when a level at the input port To is changed from L to H. When the content of the count register reaches 19, the content (ACK) of the bits from 12th bit to 19th bit in the receiving register is checked. If all of those bits assume L (this represents the completion of receiving: ACK"0"), the output port P11 is caused to assume H again and the output port P10 is allowed to issue pulses corresponding to the frame which comprises the mark code (10 bits), 1 start bit and the ACK 8 bits of H throughout. Next, the output port P10 is caused to assume L for a predetermined time period and then the output port P11 is turned to L. After that, the input port To is monitored for a predetermined time period. If the input port To assumes H during such minotoring time, the data is written in the receiving register in the same manner as mentioned above and then the data is read out while decrementing a limit counter. When the data provides the ACK 8 bits of L (the ACK represents a replaying code composed of 8 bits and indicates the completion of receiving in the case that all bits assume L=0 or the completion of transmitting in the case that all bits assume H=1), this is decided to indicate the completion of receiving. If the input port To is not turned to H for a predetermined time period after receiving the code (ACK=L×8 bits) for the completion of receiving, the CPU1 in the control board 31 returns to the step of key input reading. In the case that the code (ACK=L×8 bits) for the completion of receiving is not fed in a predetermined time period after sending the data frame (FIG. 3a), the data frame is transmitted again while decrementing the limit counter. When the content of the limit counter becomes zero, this is assumed as anomaly so that an alarm lamp on the control board is set to illuminate and a flow returns to the step of key input reading. If the input port To is turned to H again after receiving the ACK (=L×8 bits) frame which represents the completion of receiving, the data is read out while decrementing the limit counter. With the data being of the ACK=L×8 bits, the ACK=H×8 bits (ACK"1")which represents the completion of transmitting is sent out again, whereas with the data not being of the ACK=L×8 bits, the limit counter is further decremented. In the case that the limit counter becomes zero after receiving the ACK "0" which represents the completion of receiving, an alarm indication is set and a flow returns to the step of key input reading. During the key input reading, state signals on the input ports are read at intervals of a predetermined time period and then compared with memory bits stored in the input register. If any input is different from the memory bit in the input register, it is assumed that there occurs any key or switch input and, then the above mentioned transmitting and receiving will be carried out after writing the input state signals in the input register.

Figure 4B:
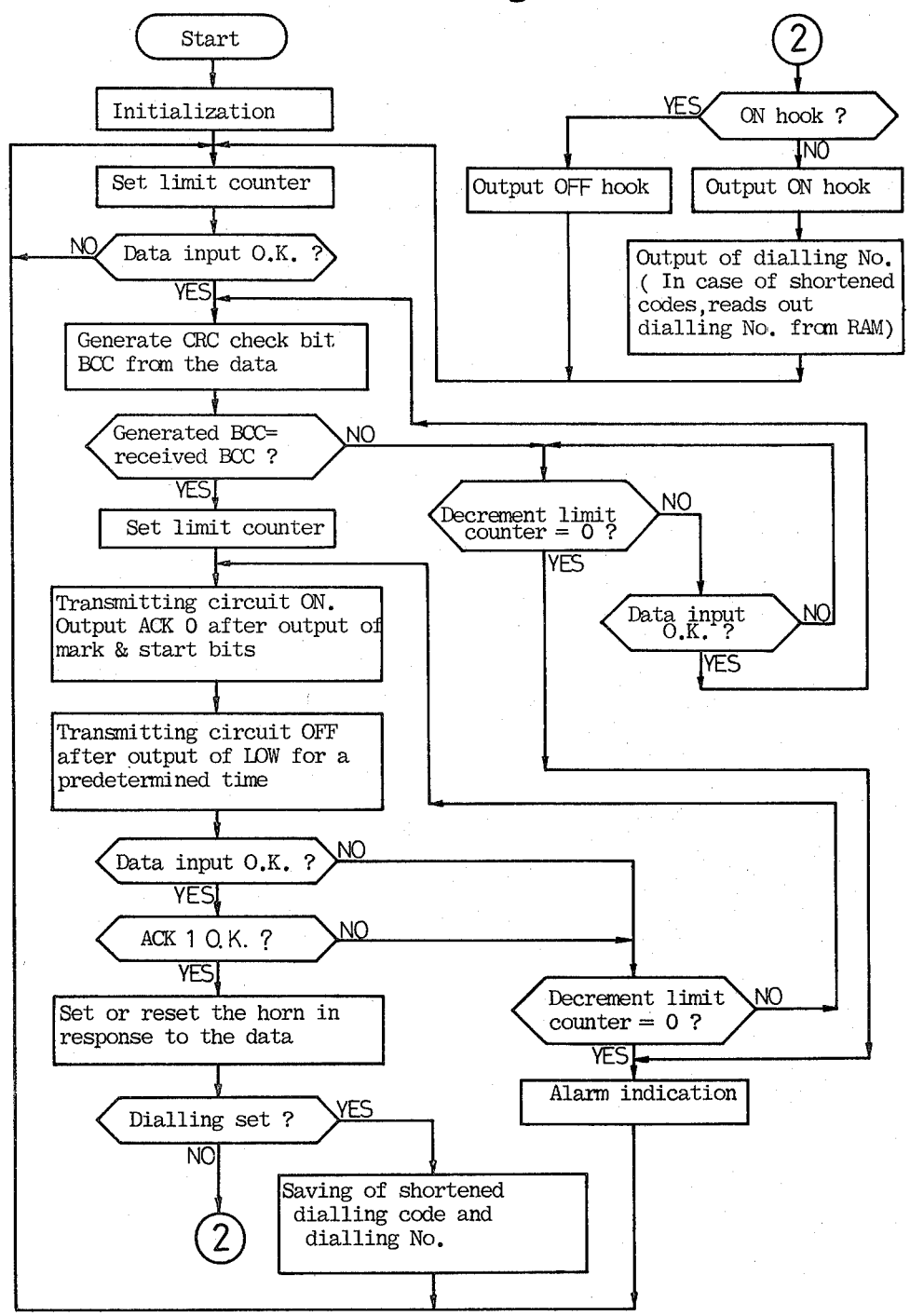
FIG. 4d is a flow chart showing the signal processing operation of a microcomputer CPU2 shown in FIGS. 2e and 2f.

FIG. 4b shows a flow chart for a receiving/transmitting control of the microcomputer CPU2 (FIG. 3b) incorporated in the fixed electric controller. This flow is similar to that of a transmitting/receiving control for the CPU1 in the control board, but different in that the CRC check bits are produced from the data bit and then compared with the received BCC so as to check an error in the transmitting and receiving, that after receiving with no error there is sent out a receiving completion frame formed by converting the data section of the data frame (FIG. 3a) into 8 bits of L (i.e. ACK "0"), and that the received data is converted into hook signal, dialling signals or horn energizing signal.

According to the first embodiment as stated above, when the branch telephone ring and the hook switch 33 is closed by the driver, OFF hook signal indicating taking up of the driver telephone (34, 181, 182) is transmitted to the branch connection circuit 180 and the lamp FL is energized at the same time. The branch connection circuit 180 connects the driver telephone (34, 181, 182) to the mobile telephony device 184. Then the speaker 182 broadcasts the voice of a caller. The voice of the driver is caught by the microphone 181 and transmitted to the mobile telephony device 184. When the hook switch 33 is closed once more, the lamp FL is deenergized and ON hook signal is transmitted to the branch circuit 180. When the driver places a call, the driver closes the key switch *, closes dialling ten-key switches, and then closes the key switch * once more. The CPU1 memorizes the dialling No. data. Thereafter the driver closes the hook switch 33. The CPU1 transmits the OFF hook signal to the branch connection circuit 180, which in turn connects the driver telephone (CPU2, 181, 182) to the mobile telephony device 184. The CPU2 transmits the dialling code data to the mobile telephony device 184 through the branch connection circuit 180. The CPU2 is backed-up by the additional battery 171 and, in occasion of receipt of OFF hook signal, transmits the dialling code data which is previously received and memorized in the CPU2 to the branch connection circuit 180. If the voltage Vcc should fall under a predetermined level, the voltage detection circuit 170 generates the "reset" signal and applies it to the CPU2, which in turn returns to initiallization.

Figure 5A:
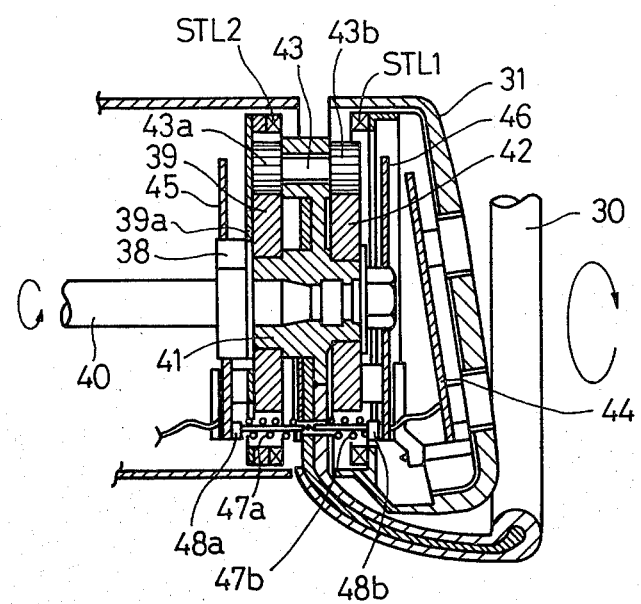
FIG. 5a is a longitudinal sectional view showing a combination of the slip rings 45, 46 and the brushes 48a, 48b and a pair of electric coils in accordance with a second embodiment of the invention.
Figure 5B:
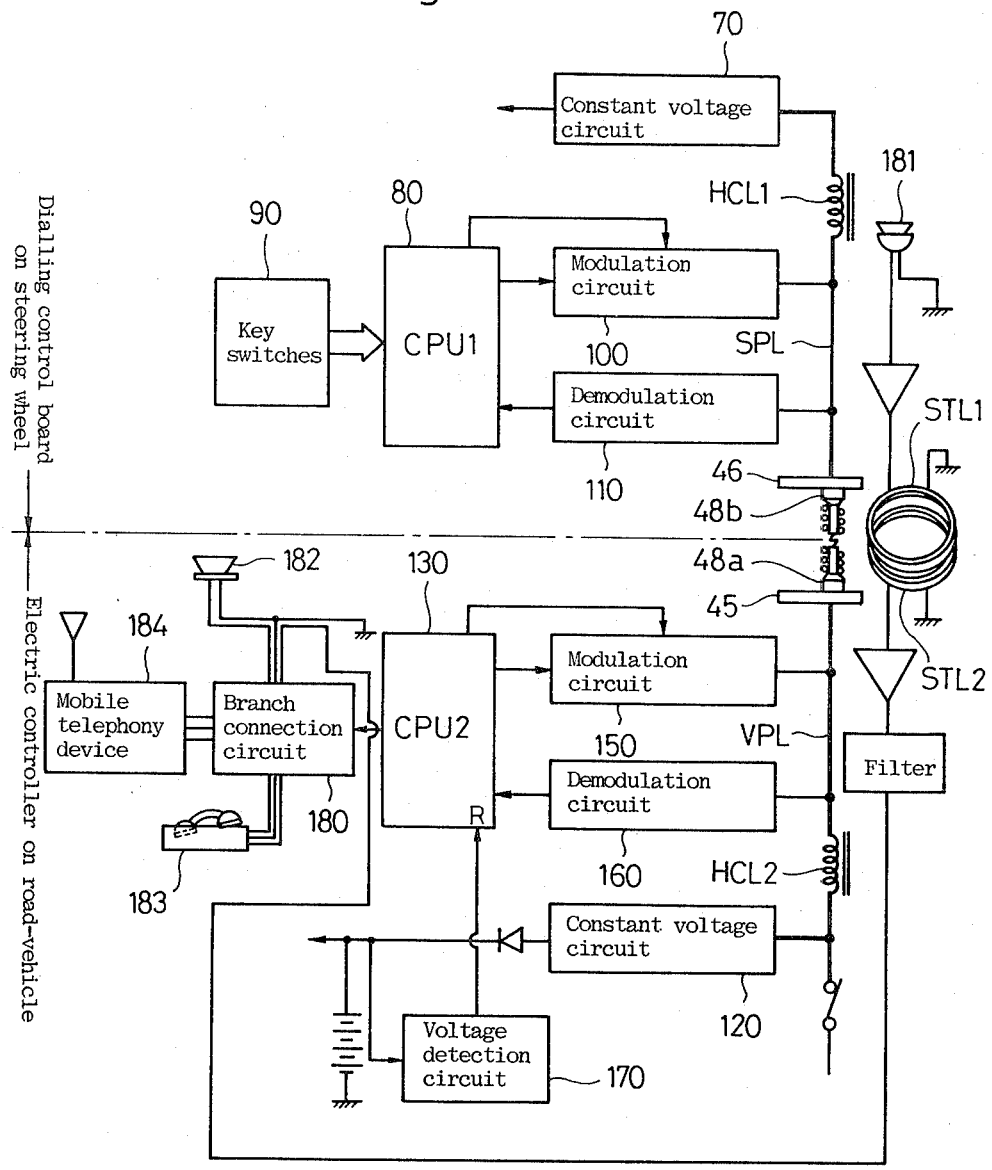
FIG. 5b is a block diagram showing a schematic constitution of the second embodiment.

FIGS. 5a and 5b show the respective parts of a second embodiment of the invention, which are different from those of the first embodiment hereinabove. Referring to FIG. 5a, a pair of electric coils STL1 and STL2 are rigidly mounted to the control board 31 and the stationary toothed wheel 39, respectively. These electric coils are disposed to face each other with a space therebetween, in which space the connecting member 43 is turned. Referring to FIG. 5b, the microphone 181 is connected to the coil STL1 through an amplifier. The coil STL2 is connected to the branch connection circuit 180 through an amplifier and a filter. Thus the voice of the driver is caught by the microphone 181 and transmitted to the branch circuit through the pair of electric coils STL1 and STL2. The microphone 181 of the second embodiment is located on the dialling control board 31. A modulation circuit may be interposed between the microphone 181 and the coil STL1, and a demodulation circuit may be interposed between the coil STL2 and the branch circuit 180. The speaker 182 may also be located on the dialling control board 31 with a connection similar to that of the microphone 181.

According to the invention as described hereinbefore, the dialling control board is stationary with respect to the steering wheel, which makes easy the operation of the dialling key switches and the hook key switches. In this way direct wirings between the dialling control board on the steering wheel and stationary equipments on the load-vehicle are elminated. Thus an arrangement around the steering shaft is relatively simple.

Having now fully set forth both structure and operation of preferred embodiments of the concept underlying the present invention, various other embodiments as well as certain variations and modifications of the embodiments herein shown and described will obviously occur to those skilled in the art upon becoming familiar with the underlying concept. It is to be understood, therefore, that within the scope of the appended claims, the invention may be practiced otherwise than as specifically set forth herein.

What we claim is:

1. A telephone transmission system on a roadvehicle comprising:
    a dialling control board supporting mechanism mounted on a steering wheel adapted to support a dialling control board in a stationary state relative to the road vehicle irrespective of a rotation of said steering wheel;
    a plurality of input key switches including ten key switches and a hook switch, a moudlation circuit and a transmitting control electronic device which are incorporated in said dialling control board;
    an electric controller disposed on the road-vehicle at a position mechanically remote from said steering wheel, including a demodulation circuit and a receiving control electronic device and connected to a mobile telephony device on the road-vehicle; and
    an electric coupling means adapted to electrically couple said control board and said electric controller.

2. A telephone transmission system according to claim 1, wherein said electric coupling means comprises a first slip ring fixedly mounted to said dialling control board, a second slip ring opposite to said first slip ring, and brushes brought into a contact with both said slip rings and rotated together with said steering wheel.

3. A telephone transmission system according to claim 2, wherein the modulation circuit of said dialling control board is coupled to said first slip ring and the demodulation circuit of said electric controller is coupled to said second slip ring.

4. A telephone transmission system according to claim 3, wherein said dialling control board includes a first constant voltage power supply circuit, said electric controller includes a second constant voltage power supply circuit, said first constant voltage power supply circuit is connected to said first slip ring, and said second slip ring is connected to a road-vehicle power supply and said second constant voltage power supply circuit.

5. A telephone transmission system according to claim 4, wherein said control board includes a second demodulation circuit coupled to said first slip ring and said electric controller includes a second modulation circuit coupled to said second slip ring.

6. A telephonetransmission system according to claim 5, wherein said first and second modulation circuits are Frequency Shift Keying modulation circuits and said first and second demodulation circuits are Frequency Shift Keying demodulation circuits; said transmitting control electronic device forms, in response to the closing of said key switches, control data for telephone connection controlled by said mobile telephony device, then renders the control data to said first modulation circuit, then returns to a key switch input standby state when reception informing data arrives from said second demodulation circuit after sending the control data, and then renders again the control data to said first modulation circuit when the reception informing date fails to arrive; and said receiving control electronic device renders the reception informing data to said second modulation circuit when receiving the control data from said first demodulation circuit and then renders communication instruction to the mobile telephony device.

7. A telephone transmission system according to claim 1, wherein a microphone is equipped on an inner panel at the front of a driver seat, said microphone is electrically connected to the mobile telephony device.

8. A telephone transmission system according to claim 1, wherein a microphone is equipped on the dialling control board, said microphone is electrically connected to the mobile telephony device.

9. A telephone transmission system according to claim 8, wherein the microphone is electro magnetically connected to the mobile telephony device.

10. A telephone transmission system according to claim 1, wherein said electric coupling means includes a power coupling device and an electric coil device, said power coupling device comprising a first slip ring rigidly fixed to said control board, a second slip ring opposite to said first slip ring, and brushes brought into contact with both said slip rings and rotated together with said steering wheel, and said electric coil device comprising a first electric coil rigidly fixed to the dialling control board and a second electric coil opposite to said first electric coil.

11. A telephone transmission system according to claim 10, wherein a microphone is equipped on the dialling control board, said microphone is electrically connected to the mobile telephony device through the electric coil device.

12. A telephone transmission system according to claim 10, wherein the microphone is connected to the first electric coil through an amplifier, and the second electric coil is connected to the mobile telephony device through an amplifier and a filter.

13. A telephone transmission system according to claim 11, wherein the modulation circuit of said dialling control board is coupled to said first slip ring and the demodulation circuit of said electric controller is coupled to said second slip ring.

14. A telephone transmission system according to claim 13, wherein said dialling control board includes a first constant voltage power supply circuit, said electric controller includes a second constant voltage power supply circuit, said first constant voltage power supply circuit is connected to said first slip ring, and said second slip ring is connected to a load-vehicle power supply and said second constant voltage power supply circuit.

15. A telephone transmission system according to claim 14, wherein said control board includes a second demodulation circuit coupled to said first slip ring and said electric controller includes a second modulation circuit coupled to said second slip ring.

16. A telephone transmission system according to claim 15, wherein said first and second modulation circuits are Frequency Shift Keying modulation circuits and said first and second demodulation circuits are Frequency Shift Keying demodulation circuits; said transmitting control electronic device forms, in response to the closing of said key switches, control data for telephone connection controlled by said mobile telephony device, then renders the control data to said first modulation circuit, then returns to a key switch input standby state until reception informing data arrives from said second demodulation circuit after sending the control data, and then renders again the control data to said first modulation circuit when the reception informing data fails to arrive; and said receiving control electronic device renders the reception informing data to said second modulation circuit when receiving the control data from said first demodulation circuit and then renders communication instructions to the mobile telephony device.

* * * * *